United States Patent [19]

Norton

[11] Patent Number: 4,897,004

[45] Date of Patent: Jan. 30, 1990

[54] BLIND FASTENER WITH SELF-LOCKING COLLAR

[75] Inventor: Merle E. Norton, Anaheim, Calif.

[73] Assignee: Textron, Inc., Providence, R.I.

[21] Appl. No.: 222,326

[22] Filed: Jul. 20, 1988

Related U.S. Application Data

[63] Continuation of Ser. No. 878,613, Jun. 26, 1986, abandoned.

[51] Int. Cl.[4] .......................... F16B 13/04; F16B 13/06
[52] U.S. Cl. .......................................... 411/43; 411/55; 411/70; 29/525.2
[58] Field of Search ................................ 411/34–38, 411/39–43, 55, 70; 29/525.1, 525.2

[56] References Cited

U.S. PATENT DOCUMENTS

| | | | |
|---|---|---|---|
| 2,061,628 | 11/1936 | Huck | 218/29 |
| 2,466,811 | 4/1949 | Huck | 218/29 |
| 2,526,235 | 10/1950 | Huck | |
| 3,148,578 | 9/1964 | Gapp | |
| 3,377,908 | 4/1968 | Stau et al. | |
| 4,012,984 | 3/1977 | Matuschek | |
| 4,143,580 | 3/1979 | Luhm | |
| 4,407,619 | 10/1983 | Siebol | 411/43 |
| 4,451,189 | 5/1984 | Pratt | 411/34 |
| 4,473,914 | 10/1984 | Haft | 411/43 |

FOREIGN PATENT DOCUMENTS

| | | | |
|---|---|---|---|
| 482819 | 4/1977 | Australia . | |
| 491480 | 3/1978 | Australia . | |
| 496024 | 9/1978 | Australia . | |
| 1527480 | 9/1972 | Fed. Rep. of Germany . | |
| 2315031 | 1/1977 | France . | |
| 2124317 | 2/1984 | United Kingdom . | |
| 86/01565 | 3/1986 | World Int. Prop. O. | 411/43 |

OTHER PUBLICATIONS

Allfast Fastening Systems Introduces AllMax.

*Primary Examiner*—Neill R. Wilson
*Attorney, Agent, or Firm*—Knobbe, Martens, Olson & Bear

[57] ABSTRACT

An elongated stem extends through a bore in a sleeve having a preformed head at one end. The sleeve extends through aligned holes in one or more workpieces to be fastened together. Pulling the stem through the sleeve causes an enlarged tail on the stem to be drawn into the end of the sleeve opposite the preformed head. The sleeve thus expands, forming a blind head. The workpieces are sandwiched between the preformed head and the blind head. To prevent the stem from sliding out of the sleeve, a locking collar is provided within the sleeve bore. The collar is slideable from a first position spaced from the preformed head to a second position within the preformed head. The collar is engaged by a shoulder on the stem and is moved from the first position to the second position as the stem is pulled through the sleeve. When in the second position, the collar is prevented from further movement, and is deformed as the stem continues to advance. The deformed collar fills an annular lock pocket within the preformed head and an annular locking groove surrounding the stem, thus preventing movement of the stem relative to the sleeve. The collar is formed from the sleeve material and is positioned within the sleeve prior to the insertion of the stem. In the manufacture of the sleeve, a reduced diameter bore portion is formed. An annular portion of the sleeve material surrounding the reduced diameter bore portion is separated from the remainder of the sleeve in a shearing operation, thus forming the collar.

24 Claims, 6 Drawing Sheets

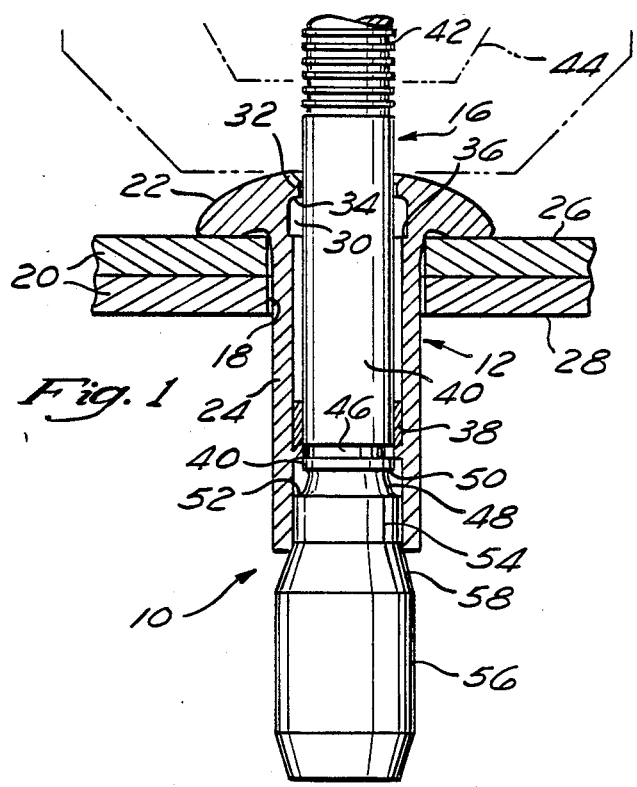
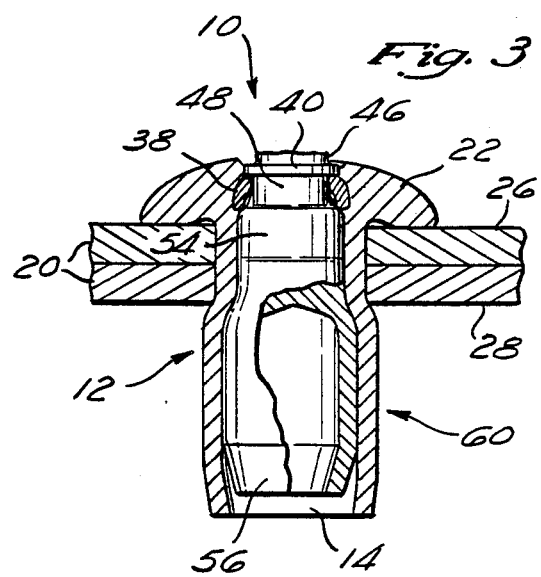
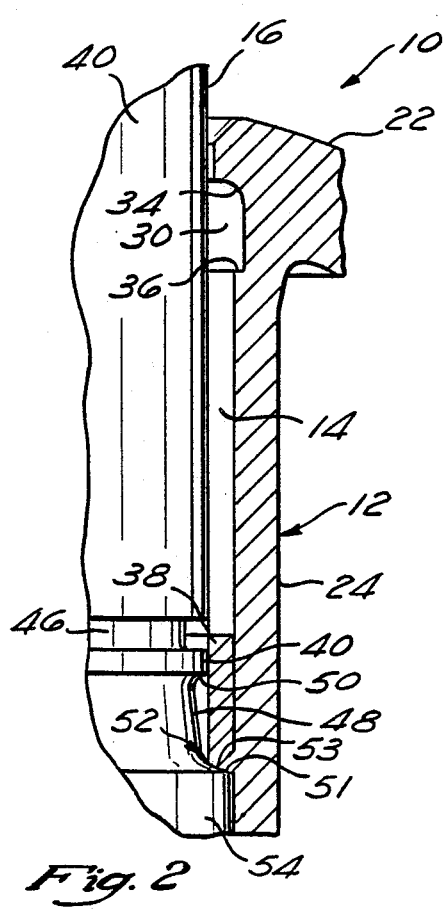
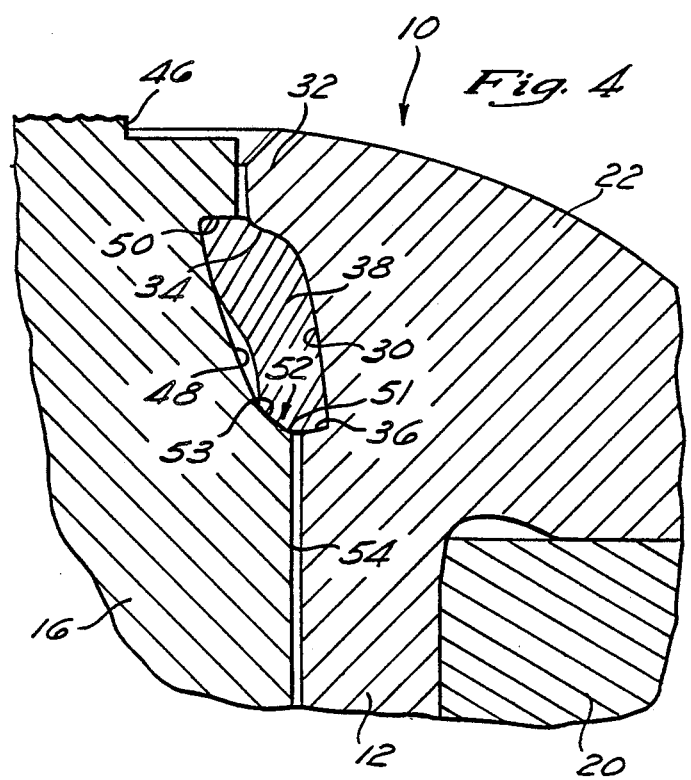

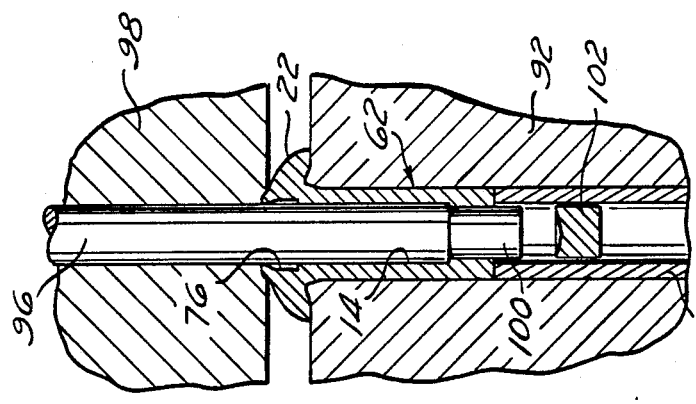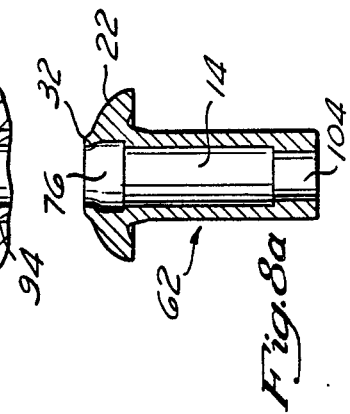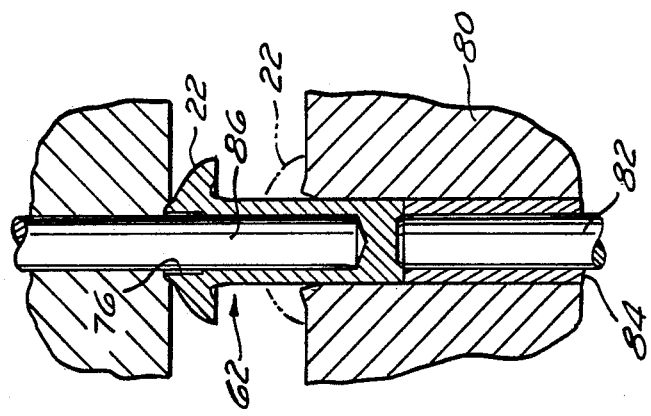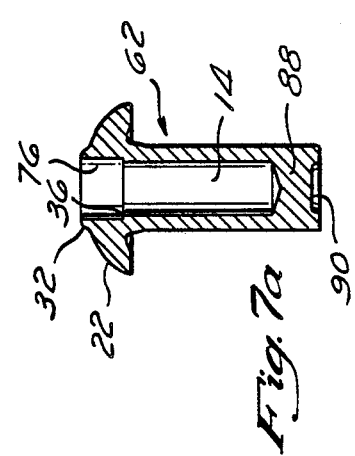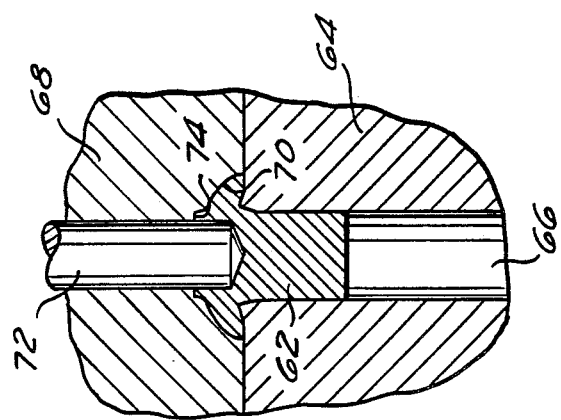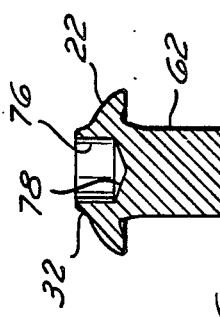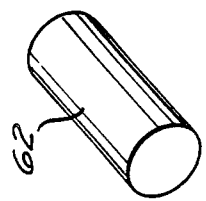

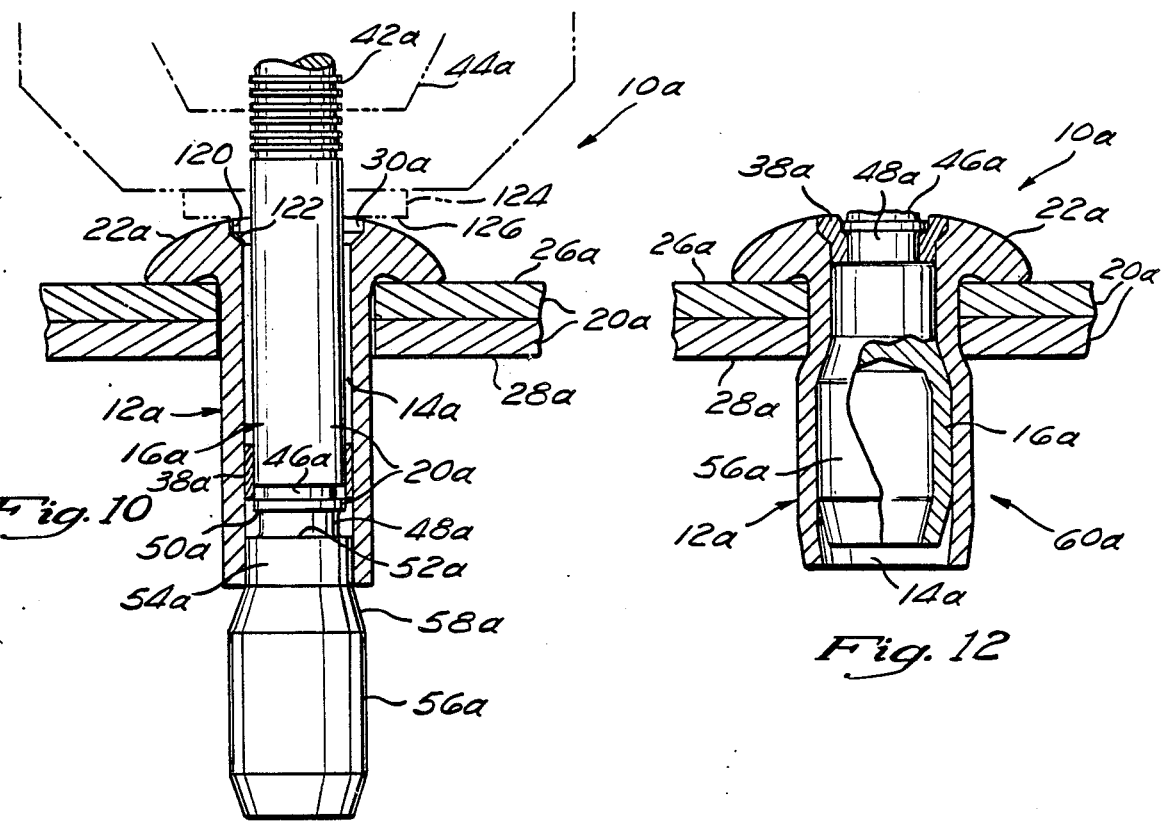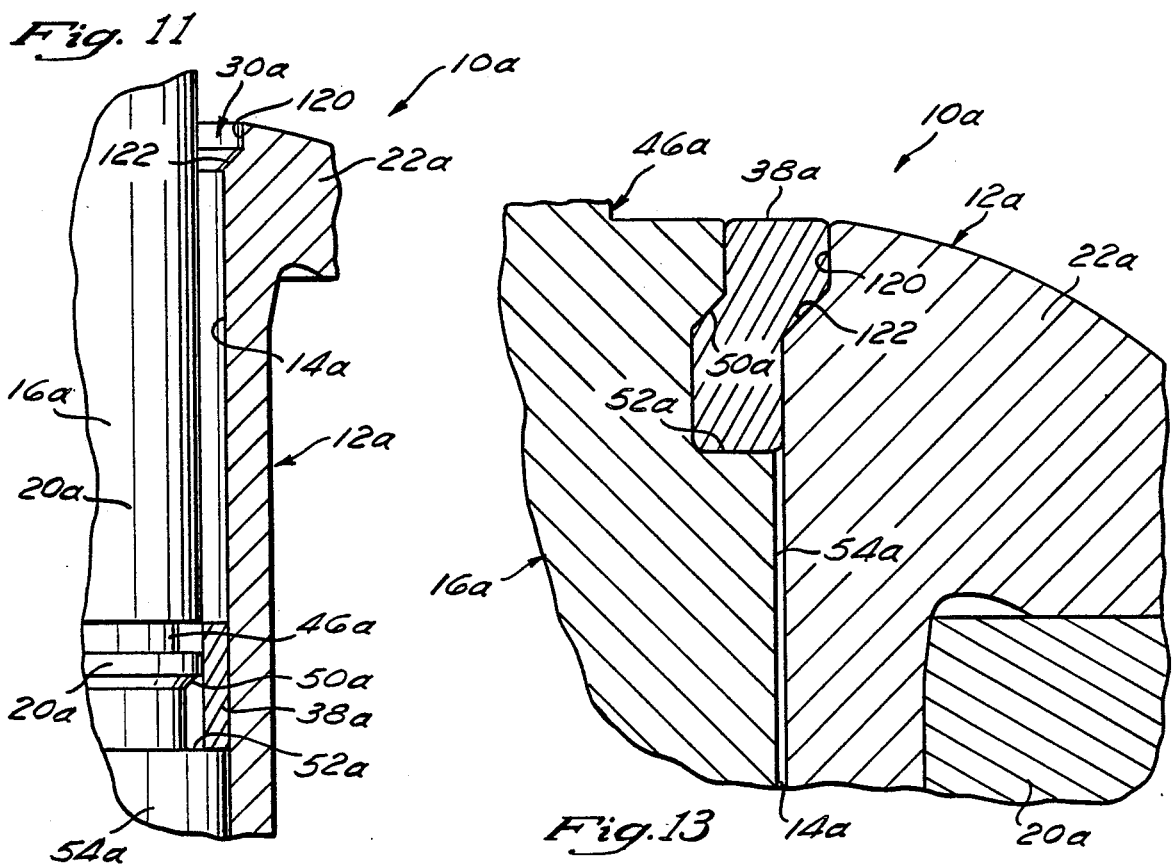

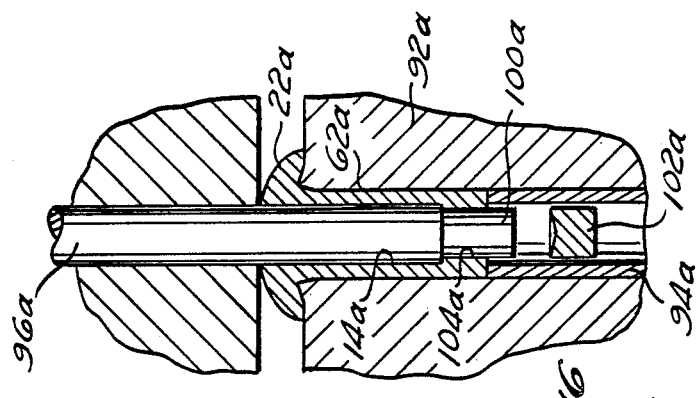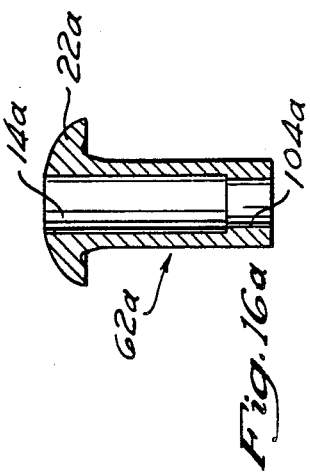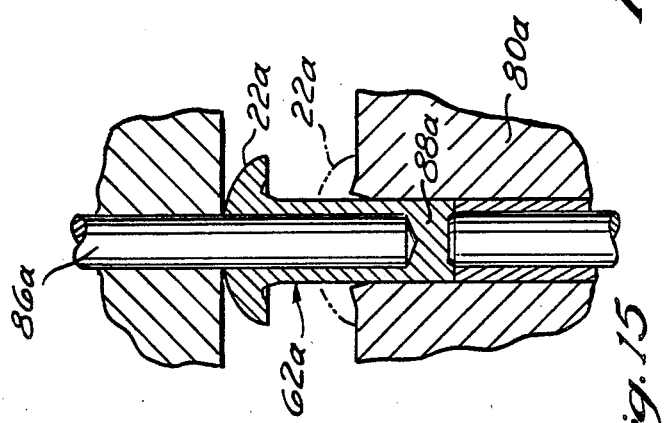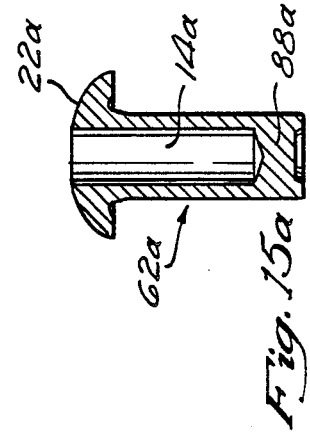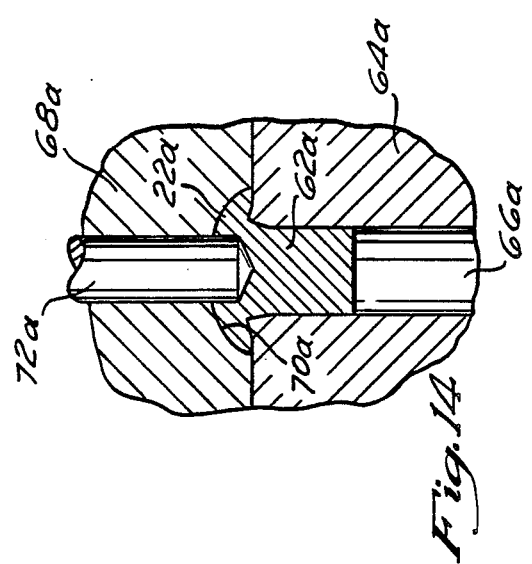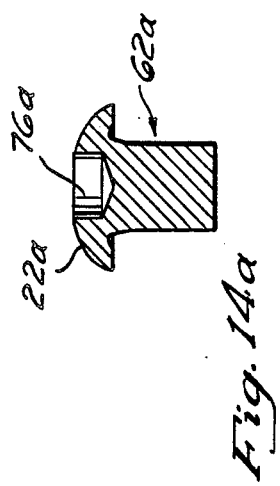

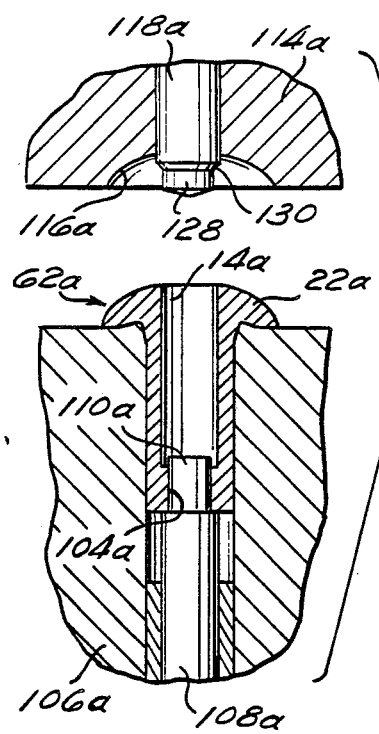
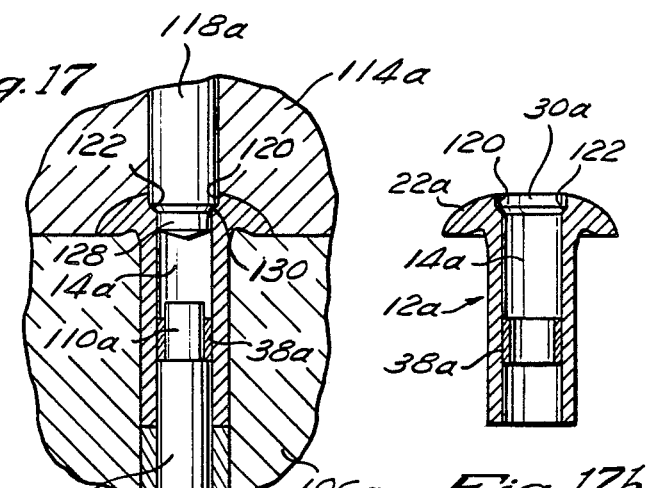
Fig. 17
Fig. 17a
Fig. 17b 4,897,004

BLIND FASTENER WITH SELF-LOCKING COLLAR

This application is a continuation, of application Ser. No. 878,613, filed June 26, 1986, now abandoned.

BACKGROUND OF THE INVENTION

The present invention relates generally to the field of fasteners, and more particularly to a "blind" rivet having a locking collar and a method for manufacturing such a rivet.

Blind rivets are specially designed to allow one or more workpieces to be fastened together without requiring access to the rear or blind side of the workpieces. Blind rivets have many industrial applications, and are also useful in the construction of aircraft. Typically, a blind rivet will be comprised of a tubular sleeve having a preformed head at one end. An elongated stem extends through the sleeve and terminates in an enlarged tail, which protrudes from the end of the sleeve opposite the preformed head.

To install such a blind rivet, the sleeve and stem are passed through a hole in the workpiece so that the preformed head abuts the front or accessible side of the workpiece, with the tail of the stem protruding through the rear side. An installation tool is used to pull on the end of the stem which protrudes through the preformed head while pushing against the preformed head, resulting in an equal force on the rivet. As a result, the tail of the stem is introduced to the sleeve. This causes the sleeve to expand radially and form a "blind head" on the rear side of the workpiece. The workpiece is thus sandwiched between the preformed head and the blind head.

Since the rivet installation is often subject to vibration, it is possible for the stem to come loose and slide back out of the sleeve even after the blind head is formed. To prevent this, previous blind rivets have provided a locking collar between the stem and the sleeve. The collar is deformed to expand radially and fill a lock groove surrounding the stem and a lock pocket within the preformed head. The lock pocket typically comprises a counterbore in the preformed head, of such a shape that the collar can be deformed into the counterbore by being compressed against a surface on the installation tool.

While previous locking collars have been satisfactory in terms of their ability to lock the stem in place, they have suffered from several drawbacks. The locking collar is most usually a separate part which must be formed independently of the sleeve and stem, and then wrapped around or assembled on the stem. Forming and installing the collar adds extra steps to the manufacturing process, in which large quantities of rivets must be produced economically, and to stringent quality standards.

In some previous designs, a locking collar has been formed as an integral part of the sleeve, and protrudes outwardly from the preformed head. During installation, the collar is separated from the head and driven into the sleeve. However, the method employed to form these integral locking collars has been complex and costly.

Further, previous locking collars have often required specially designed installation tools which engage the collar so as to cause its deformation, as discussed above. These installation tools are dedicated for use with a particular type and diameter fastener, and thus are unsuited for use with other types of fasteners or different diameter fasteners. As a result, a new set of installation tools must be purchased each time a rivet of a different type or diameter is to be used.

Thus, a need exists for a blind rivet with a locking collar that can be easily manufactured and installed with a variety of tools.

SUMMARY OF THE INVENTION

The present invention is a fastener comprised of a tubular sleeve with a preformed head at one end, and a stem which extends through the sleeve. An annular collar is positioned within the sleeve prior to insertion of the stem, and is preferably slidable from a first position spaced from the preformed head to a second position within the preformed head. As the stem is pulled through the sleeve, the collar is pushed from the first position to the second position by a shoulder on the stem. When in the second position, the collar is deformed to at least partially fill a lock groove on the stem and a lock pocket in the sleeve, thus locking the sleeve and collar together.

The collar is formed from a portion of sleeve material which is separated from the sleeve as the sleeve is being formed. As a result, the collar is positioned within the sleeve prior to the insertion of the stem within the sleeve. The collar frictionally engages the sleeve so as to remain in position without support from the stem. Thus, no separate forming or installing procedures are required for the collar. Further, the sleeve and collar can be entirely formed on a multiple station progressive header, a machine tool which is commonly used in the fabrication of fasteners.

A fastener according to one embodiment of the present invention can be installed with virtually any type of installation tool. The lock pocket within the sleeve is enclosed by a lip which has a downwardly facing surface. The collar is deformed by being compressed between the downwardly facing surface and the stem shoulder. Thus, the installation tool need not be designed to engage the collar or even any particular portion of the preformed head. Consequently, the fastener may be used interchangeably with different type or diameter fasteners, while still using the same installation tool.

BRIEF DESCRIPTION OF THE DRAWINGS

FIG. 1 is a partial cross sectional view of a blind rivet according to one embodiment of the present invention, prior to installation of the rivet, and with an installation tool shown in broken lines.

FIG. 2 is an enlarged partial cross sectional view of the rivet in FIG. 1, showing the stem being pulled through the sleeve.

FIG. 3 is a partial cross sectional view of the rivet in FIG. 1 once fully installed.

FIG. 4 is an enlarged cross sectional view of the rivet installation shown in FIG. 3.

FIG. 5 is a perspective view of a blank which is formed into the sleeve of the rivet shown in FIG. 1.

FIG. 6 is a partial cross sectional view showing the first step of the sleeve manufacturing process, in which a pilot hole is punched and an upset head is formed on the blank.

FIG. 6a shows the blank after the forming step shown in FIG. 6.

FIG. 7 is a partial cross sectional view showing the second step of the sleeve manufacturing process, in which the blank is extruded.

FIG. 7a shows the blank after the forming step shown in FIG. 7.

FIG. 8 is a partial cross sectional view showing the third step of the sleeve manufacturing process, in which a cylindrical slug is sheared out of the closed end of the blank.

FIG. 8a is a cross sectional view of the blank after the forming step shown in FIG. 8.

FIG. 9b is a cross sectional view of the completed sleeve after the forming step shown in FIGS. 9 and 9a.

FIG. 10 is a partial cross sectional view of a blind rivet according to a second embodiment of the present invention, prior to installation, and with an installation tool shown in broken lines.

FIG. 11 is an enlarged partial cross sectional view of the rivet shown in FIG. 10, showing the stem being pulled through the sleeve.

FIG. 12 is a partial cross sectional view of the rivet in FIG. 10, once fully installed.

FIG. 13 is an enlarged cross sectional view of the rivet installation shown in FIG. 12.

FIG. 14 is a partial cross sectional view showing the first step of the sleeve manufacturing process for the sleeve shown in FIG. 10, in which a pilot hole is punched and an upset head is formed on a blank.

FIG. 14a shows a blank after the forming step shown in FIG. 14.

FIG. 15 is a partial cross-sectional view showing the second step of the sleeve forming process, in which the blank is extruded.

FIG. 15a shows the blank after the forming step shown in FIG. 15.

FIG. 16 is a partial cross sectional view showing the third step in the sleeve manufacturing process, in which a cylindrical slug is sheared out of a closed end of the blank.

FIG. 16a shows the blank after the forming step shown in FIG. 16.

FIG. 17 is a partial cross sectional view showing the blank installed within a die which is used in the fourth step of the sleeve manufacturing process, with the die in a raised position.

FIG. 17a is a partial cross sectional view showing the fourth step of the sleeve manufacturing process, in which the collar is sheared from the sleeve, by moving the die to a lowered position.

FIG. 17b is a cross sectional view of the completed sleeve after the fourth forming step shown in FIG. 17 and 17a.

DETAILED DESCRIPTION OF A PREFERRED EMBODIMENT

Figure 9:
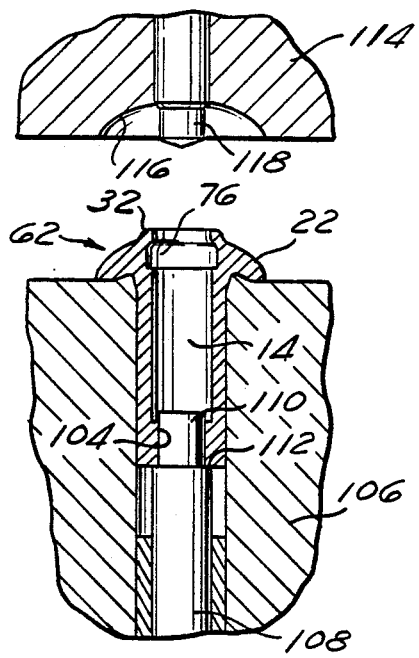
FIG. 9 shows the blank within the die used in the fourth step of the sleeve manufacturing process, with the die in a raised position.

The present rivet assembly 10 is shown in FIG. 1, and is comprised of a tubular sleeve 12 having a central bore 14 throughout, and an elongated stem 16 extending through the bore 14. The stem 16 is manufactured separately from the sleeve 12 and is inserted therein to be sold as an assembly 10. In use, the rivet assembly 10 is passed through aligned holes 18 in a pair of workpieces 20 which are to be fastened together. A small clearance is provided between the sleeve 12 and the workpieces 20. One end of the sleeve 12 terminates in a preformed head 22, and a tubular body 24 extends downwardly from the head 22. The preformed head 22 has a larger diameter than the sleeve body 24 so that the head 22 will abut against a front side 26 of the workpieces 20, while the body 24 extends through the holes 18 and protrudes outwardly from a rear or "blind" side 28 of the workpieces 20.

The sleeve 12 includes an annular lock pocket 30 within the preformed head 22. The lock pocket 30 has a greater diameter than the bore 14. The upper end of the lock pocket 30 terminates in a radially inwardly protruding lip 32. The lip 32 has a diameter which is smaller than the bore 14, yet sufficiently large to allow the stem 16 to pass through. The lip 32 defines a slightly curved, substantially downwardly facing surface 34 which, like the lip 32, extends radially into the bore 14.

The lower end of the lock pocket 30 terminates in a substantially upwardly facing shoulder 36 on the sleeve 12. As is best shown in FIG. 4, the sleeve shoulder 36 is angled at approximately 15° from a horizontal plane. Preferably, the angle of the sleeve shoulder 36 is within the range of 0°–45°.

As used herein, the term "upward" refers to the direction towards the preformed head 22, and parallel to the longitudinal axis of the bore 14. Conversely, "downward" is the direction away from the preformed head 22, and toward the sleeve body 24. These directional references correspond to the orientation of the rivet assembly 10 shown in the drawings.

An annular locking collar 38 is provided within the bore 14. The collar 38 is slideable within the bore 14, and initially is held in a stationary position within the sleeve body 24. As is discussed in more detail below, the collar 38 is formed from the sleeve material by separating a portion of sleeve material from the remainder of the sleeve 12. Preferably, the lower end of the collar 38 is still attached to the sleeve 12. The collar 38 is a continuous ring of material and has no peripheral separations, as would a flat strip of material that is rolled into a ring shape. The outside diameter of the collar 38 is such that there is frictional engagement between the bore 14 and the collar 38. The collar 38 is positioned within the bore 14 prior to the insertion of the stem 16, and remains in position without support from the stem 16.

The stem 16 includes an elongated cylindrical portion 40 which protrudes upwardly through the preformed head 22. The diameter of the cylindrical portion 40 is sufficiently small to allow the cylindrical portion 40 to extend through the lip 32 and through the collar 38. At the upper end of the cylindrical portion 40, above the preformed head 22, a plurality of pull grooves 42 are provided to facilitate the grasping of the stem 16 by an installation tool 44, shown in broken lines. At the lower end of the cylindrical portion 40, a weakened breakneck groove 46 is provided. When sufficient tension is supplied to the stem 16 by the installation tool 44, the stem 16 will fracture in a radial plane through the breakneck groove 46.

As is best shown in FIG. 2, adjacent the lower end of the cylindrical portion 40 is an annular lock groove 48 which surrounds the periphery of the stem 16. The lock groove 48 is tapered inwardly so that at least a portion of the lock groove 48 has a smaller diameter than the cylindrical portion 40 of the stem 16. The upper end of the lock groove 48 terminates in a downwardly facing stem shoulder 50, while the lower end of the lock groove 48 terminates in an upwardly facing stem shoulder 52. The upwardly facing stem shoulder 52 includes a horizontally oriented portion 51 which is formed by an enlarged diameter portion 54 of the stem 16. The horizontally oriented portion 51 has an outside diameter approximately equal to the diameter of the bore 14, and an inside diameter greater than that of the collar 38. The shoulder 52 also includes a curved portion 53 formed by the joinder of the lock groove 48 and the horizontal portion 51. As used herein, the stem shoulder 52 refers to any upwardly facing surface on the stem 16 which engages the collar 38.

The stem 16 also includes an enlarged tail 56 which protrudes outwardly from the end of the sleeve 12 opposite the preformed head 22. The tail 56 has a greater diameter than the bore 14, and is joined to the enlarged portion 54 of the stem 16 by a frusto-conical tapered portion 58. The outside diameter of the tail 56 is sufficiently small to allow the tail 56 to pass through the holes 18 in the workpieces 20.

The rivet assembly 10 is designed to be installed without access to the rear side 28 of the workpieces 20, and thus is considered a "blind" fastener. To install the rivet 10, the rivet 10 is first inserted in the holes 18 from the front side 26 of the workpieces 20, until the preformed head 22 abuts the workpieces 20, as shown in FIG. 1. The pull grooves 42 on the stem 16 are then grasped with the installation tool 44 and the stem 16 is pulled upwardly, through the sleeve 12.

Referring to FIG. 2, as the stem 16 advances, the upwardly facing stem shoulder 52 will engage the collar 38, causing the collar 38 to slide upwardly with the stem 16 and be completely separated from the sleeve 12. The collar 38 and stem 16 continue to advance until the collar 38 and lock groove 48 are radially aligned within the lock pocket 30, as shown in FIGS. 3 and 4. When in this position, the collar 38 will abut against the downwardly facing surface 34 of the lock pocket 30, thus preventing further movement of the collar 38. Continued movement of the stem 16 compresses the collar 38 between the downwardly facing surface 34 and the stem shoulder 52, resulting in deformation of the collar 38. When deformed, the collar 38 expands radially to at least partially fill the lock groove 48 and the lock pocket 30.

Simultaneously, the tail 56 enters the sleeve body 24 and causes radial expansion of the sleeve 12 to form a blind head 60, shown in FIG. 3. The blind head 60 has a greater diameter than the holes 18, so that the workpieces 20 are clamped together between the blind head 60 and the preformed head 22. The expansion of the sleeve 12 eliminates any clearance between the sleeve 12 and the workpieces 20. Due to the resistance encountered as the tail 60 is drawn into the sleeve 12, the stem 16 will be tensioned sufficiently to fracture along the breakneck groove 46, which completes the installation of the rivet 10.

The stem 16 is a "wiredrawing" type of stem, although other types of stems (not shown) may also be used in combination with the sleeve 12. Wiredrawing, or lengthening of the stem 16, occurs as the tapered portion 58 of the stem 16 collapses inwardly as it is drawn into the portion of the sleeve 12 surrounded by the workpieces 20. This helps to prevent overstretching of the hole 18 within the workpieces 20.

Once fully installed, the stem 16 is locked within the sleeve 12 because upward motion is prevented by the tail 56, which is too large in diameter to advance through the portion of the sleeve 12 that is surrounded by the workpieces 20. Downward motion of the stem 16 is limited by the deformed collar 38. As best shown in FIG. 4, the collar 38 is effectively wedged between the downwardly facing stem shoulder 50 and the upwardly facing sleeve shoulder 36, and thus will interfere with any downward motion of the stem 16. As a result, the installed rivet assembly 10 is able to withstand severe vibrations without loosening.

Advantageously, the installation tool 44 does not have to be specially designed in order to achieve the locking effect of the collar 38. Since the collar 38 is deformed by engagement with the downwardly facing surface 34 on the lip 32, the installation tool 44 does not have to engage the collar 38 or apply pressure to the preformed head 22 at any particular location. Thus, the rivet assembly 10 can be used with any installation tool 44 which is designed to grasp and pull the stem 16.

FIGS. 5–9b illustrate a preferred method of manufacturing the sleeve 12. Preferably, the manufacturing process is carried out on a four die progressive header (not shown). The sleeve 12 is formed from a cylindrical blank 62 of metal, for example 5056 aluminum. The first step of the manufacturing process is shown in FIG. 6 and 6a. The blank 62 is inserted within a first die 64 and supported on a cylindrical knock out pin 66. A hammer 68 is positioned above the first die 64 and is movable vertically. A concave depression 70 is formed in the hammer 68, and a punching pin 72 extends downwardly through the center of the depression 70. A deeper, annular groove 74 in the hammer 68 surrounds the punching pin 72.

By lowering the hammer 68 onto the blank 62, a pilot hole 76 is punched into the blank 62 by the pin 72. The pilot hole 76 terminates at a bottom wall 78, which forms a corner with the walls of the pilot hole 76. The preformed, or upset head 22 is formed as the material of the blank 62 conforms to the shape of the concave depression 70. The blank 62 also fills the groove 74, resulting in the annular lip 32, which surrounds the pilot hole 76 and protrudes upwardly.

After completion of the first forming step, the blank 62 is removed from the first die 64 by raising the knock out pin 66, and is inserted into a second die 80, shown in FIG. 7. The blank 62 is supported in the second die 80 on a cylindrical dimple pin 82, which extends through a tubular knock out sleeve 84. In the second forming step, an elongated, cylindrical extruding pin 86, having a smaller diameter than the pilot hole 76, is introduced through the pilot hole 76. The pin 86 is driven through the bottom wall 78 and into the blank 62, causing the blank 62 to be extruded. Consequently, the blank 62 is lengthened, as illustrated by the position of the preformed head 22 before extrusion, which is shown in broken lines.

The extruding pin 86 also forms a main bore 14 which extends almost completely through the blank 62, and terminates at a closed end 88 of the blank 62. The main bore 14 has a slightly smaller diameter than the diameter of the pilot hole 76. This change in diameter results in the upwardly facing sleeve shoulder 36 at the joint between the pilot hole 76 and the main bore 14. The shoulder 36 is formed from an annular portion of the bottom wall 78 which remains after the extruding operation. To ensure the proper angle of the shoulder 36 relative to a horizontal plane, the punching pin 72 used in the first step must form a corner between the bottom wall 78 and the wall of the pilot hole 76. Also, during the second forming step, a slight depression or dimple 90 is formed on the underside of the blank 62 by the dimple pin 82.

After being extruded, the blank 62 is moved to a third die 92, shown in FIG. 8, for the third step in the manufacturing process. A tubular knock out sleeve 94 supports the bottom end of the blank 62 while in the third die 92. Above the third die 92, an elongated, cylindrical shear pin 96 extends through a hammer 98. Both the hammer 98 and the shear pin 96 are movable vertically. The tip of the shear pin 96 forms a narrow pilot 100 having a smaller diameter than the remainder of the pin 96.

The third forming step is carried out by introducing the shear pin 96 through the pilot hole 76 and into the main bore 14. The shear pin 96 has a diameter approximately equal to the diameter of the main bore 14, so that the shear pin 96 is guided by the bore 14. The shear pin 96 advances vertically downward far enough for the pilot 100 on the tip of the shear pin 96 to pierce the closed end 88 of the blank 62, and shear out a central portion of the closed end 88. After the pilot 100 passes entirely through the closed end 88, a cylindrical slug 102 drops out of the blank 62 and through the knock out sleeve 94.

As is best shown in FIG. 8a, the closed end 88 is eliminated by the shearing operation, thus leaving a reduced diameter bore 104. Since the shear pin 96 is guided by the main bore 14, the reduced diameter bore 104 is concentric with the main bore 14.

During the shearing operation, the hammer 98 engages the lip 32 and forces the lip 32 downwardly and radially inwardly, so that the lip 32 has a smaller diameter than the pilot hole 76, and partially encloses the pilot hole 76.

Figure 9A:
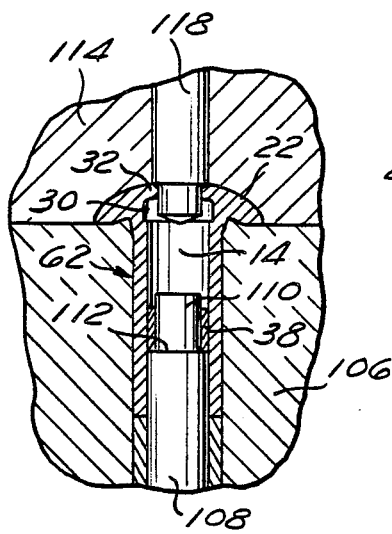
FIG. 9a shows the fourth step in the sleeve manufacturing process, in which the collar is sheared from the sleeve by moving the die to a lowered position.

The fourth and final step in the sleeve manufacturing process is shown in FIGS. 9 and 9a. The blank 62 is inserted within a fourth die 106, which is movable vertically. The die 106 is in a raised position in FIG. 9. A stationary shear pin 108 extends vertically within the fourth die 106, and terminates in a narrow pilot 110. The narrow pilot 110 is inserted through the reduced diameter bore 104 from the underside of the blank 62. A shoulder 112 is formed on the shear pin 108 at the point where the pilot 110 joins the remainder of the pin 108. The shoulder 112 abuts against the underside of the blank 62. A vertically movable hammer 114 is located directly above the fourth die 106. A concave depression 116 is formed in the hammer 114, and a small diameter pin 118 protrudes downwardly from the center of the depression 116.

The fourth forming step is a "reverse" shear operation which is achieved by lowering the hammer 114 onto the fourth die 106. The die 106 and blank 62 are thus driven to a lower position, shown in FIG. 9a. Since the shear pin 108 is stationary, lowering the blank 62 causes the shear pin 108 to advance upwardly relative to the blank 62a and into the main bore 14, thus shearing off an annular portion of the blank 62 which surrounds the reduced diameter bore 104. This sheared off material forms the annular collar 38, and is driven into the main bore 14 by the shoulder 112 on the shear pin 108. The pilot 110 provides internal support for the sheared off material so that a consistent annular shape is retained. As is best shown in FIG. 9b, since the shear pin 108 has approximately the same diameter as the main bore 14, the reduced diameter bore 104 is eliminated by the shearing operation which creates the collar 38.

Preferably, the collar 38 is not completely separated from the blank 62 by the pin 108. That is, the pin 108 does not penetrate far enough into the bore 14 to eliminate all attachment between the collar 38 and the blank 62. This attachment, while minimal, helps to prevent dislodging of the collar 38 during subsequent heat-treating operations. Alternatively, the pin 108 may penetrate further into the bore 14, leaving the collar 38 closer to or within the preformed head 22, and causing full separation of the collar 38.

During the fourth step, the hammer 114 further closes the pilot hole 76 to form the lock pocket 30. When the depression 116 on the hammer 114 engages the preformed head 22, the lip 32 is deformed further downwardly and radially inwardly, into engagement with the pin 118. The pin 118 limits the extent to which the diameter of the lip 32 can be reduced. The deformation of the lip 32 takes place in two stages, during both the third and fourth forming steps. This enables the lip 32 to be formed with a smaller inside diameter and with a smoother downwardly facing surface 34 than would be possible if the lip 32 were flattened in a single stroke.

Figure 9B:
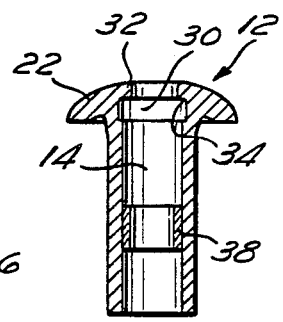

As shown in FIG. 9b, the product of the fourth forming step is the completed sleeve 12. To form the rivet assembly 10 of FIG. 2, the stem 16 is inserted through the sleeve 12.

A second embodiment of the present blind rivet 10a is illustrated in FIGS. 10-13. To indicate elements which correspond to those elements shown in FIGS. 1-4, the same numbers will be used, with the subscript "a". The rivet assembly 10a includes a sleeve 12a having a bore 14a and a stem 16a extending through the bore 14a. A preformed head 22a on the sleeve 12a abuts against a front side 26a of a pair of workpieces 20a. An annular collar 38a is positioned within the bore 14a prior to the insertion of the sleeve 16a. The collar 38a is formed from sleeve material, and has no axial separations or splits. An annular lock pocket 30a is formed in the preformed head 22a by a counterbore 120 which extends partially into the head 22. The counterbore 120 has a greater diameter than the bore 14a. A frusto-conical tapered portion 122 extends between the counterbore 120 and the bore 14a.

The stem 16a has an elongated cylindrical portion 40a with pull grooves 42a at one end and a breakneck groove 46a at the other end. The cylindrical portion 40a extends through the collar 38a and has a smaller diameter than the bore 14a. The cylindrical portion 40a is joined to an enlarged diameter portion 54a by an annular lock groove 48a surrounding the periphery of the stem 16a. The upper end of the lock groove 48a terminates at a substantially downwardly facing shoulder 50a, which is oriented at approximately a 45° angle from a horizontal plane. The lower end of the lock groove 48a is defined by a horizontal, upwardly facing stem shoulder 52a, which is formed by the enlarged diameter portion 54a. Thus, the stem shoulder 16a has a greater diameter than the cylindrical portion 40a. The stem 16a terminates at an enlarged tail 56a. The tail 56a is adjoined to the large diameter portion 54a by a tapered portion 58a.

To install the rivet 10a, an installation tool 44a, shown in broken lines, is used. The tool 44a grasps the pull grooves 42a and pulls the stem 16a through the sleeve 12a. The tool 44a includes an anvil 124 which surrounds the stem 16a and has a substantially planar surface 126 abutting the preformed head 22a. Alternatively, the anvil 124 may be formed as part of the stem 16a. Referring to FIG. 11, as the stem 16a is pulled through the sleeve 12a, the upwardly facing stem shoulder 52a abuts the collar 38a and pushes the collar upwardly. As the collar 38a is advancing through the sleeve 12a, the tail 56a of the stem 16a is drawn into the sleeve 12a, causing the sleeve 12a to expand radially and form a blind head 60a.

As shown in FIGS. 12 and 13, continued movement of the stem 16a brings the collar 38a into alignment with the lock pocket 30a, at which point the collar 38a engages the surface 126 on the anvil 124. Further upward movement of the stem 16a compresses the collar 38a between the anvil 124 and the upwardly facing stem shoulder 52a. The collar 38a is thus deformed, filling the lock groove 48a on the stem 16a, and the lock pocket 30a within the preformed head 22a. Once deformed, the collar 38a is wedged between the tapered section 122 on the lock pocket 30a and the downwardly facing stem shoulder 50a, thus preventing movement of the stem 16a relative to the sleeve 12a.

The installation is completed when the tension applied to the stem 16a by the installation tool 44a is great enough for the stem 16a to fracture along the breakneck groove 46a. The deformed collar 38a is visible from the front side 26a of the workpieces 20a, so that the rivet 10a may be inspected after installation to determine if the collar 38a is effectively locking the stem 16a and sleeve 12a together.

Turning now to FIGS. 14-17b, a preferred method of manufacturing the sleeve 12a is shown. The method can be completed on a four die progressive header (not shown), and is similar to the method shown in FIGS. 6-9b, and described above. Like numbers will be used for like elements, with the subscript "a" added.

The first step in the manufacturing process is illustrated in FIGS. 14 and 14a. A blank 62a, originally cylindrical in shape like the blank 62 of FIG. 5, is inserted into a first die 64a. A hammer 68a is lowered onto the blank 62a and a punching pin 72a on the hammer 68a punches a pilot hole 76a into the blank 62a. The blank 62a conforms to a concave depression 70a in the hammer 68a to form the upset or preformed head 22a.

The second forming step in the manufacturing process is an extruding operation, shown in FIGS. 15 and 15a. The blank 62a is supported in a second die 80a, above which is an elongate extruding pin 86a. The extruding pin 86a is lowered into the blank 62a through the pilot hole 76a and is driven downwardly with sufficient force to extrude the blank 62a. The blank 62a is lengthened, as shown by the original position of the preformed head 22a in broken lines. The extruding pin 86a also forms the main bore 14a through the majority of the blank 62a. The main bore 14a terminates at a closed end 88a of the blank 62a, and has approximately the same diameter 14a as the pilot hole 76a. Thus, the main bore 14a is effectively an extension of the pilot hole 76a.

The blank 62a is then transferred to a third die 92a, shown in FIG. 16, for the third forming step, in which the blank 62a is sheared. The blank 62a is supported on the third die 92a by a tubular knock out sleeve 94a. An elongated shear pin 96a is positioned above the third die 92a, and has a smaller diameter pilot 100a at its tip. The shear pin 96a is introduced to the blank 62a through the main bore 14a, and the pilot 100a is forced through the closed end 88a of the blank 62a, so as to shear out a cylindrical slug 102a from the closed end 88a. The slug 102a drops into the knock out sleeve 94a. Since the pilot 100a has a smaller diameter than the main bore 14a, shearing of the slug 102a leaves a reduced diameter bore 104a on the blank 62a, as shown in FIG. 16a.

Referring now to FIGS. 17, 17a and 17b, the fourth forming step is shown. The blank 62a is transferred to a fourth die 106a, which is movable in a vertical direction. The die 106a is shown in a raised position in FIG. 17, and in a lowered position in FIG. 17b. A stationary shear pin 108a is positioned within the die 106a, and has a narrow pilot 110a at its tip. The pilot 110a is inserted into the reduced diameter bore 104a from the underside of the blank 62a when the die 106a is in the raised position. The remainder of the shear pin 108a has a diameter approximately equal to the diameter of the main bore 14a. A hammer 114a is lowered onto the die 106a, causing the die 106a to slide to its lower position. The blank 62a moves downwardly along with the die 106a, and the shear pin 108a remains stationary, causing the shear pin 108a to move upwardly relative to the blank 62a. As a result, an annular portion of the blank 62a surrounding the reduced diameter bore 104a is sheared from the blank 62a, and forms a separate annular collar 38a.

While the collar 38a is being formed, a tapered pin 118a which protrudes from the hammer 114a is being driven into the preformed head 22. The pin 118a has a narrow tip 128, which has a diameter approximately equal to the diameter of the main bore 14a. A frusto-conical tapered portion 130 extends between the tip 128 and the remainder of the pin 118a, which has a diameter greater than the diameter of the tip 130. The tip 128 extends into the bore 14, while the tapered portion 130 and the remainder of the pin 118a widen the bore 14a to form the tapered portion 122 and the counterbore 120 of the lock pocket 30a, respectively. Simultaneously, a depression 116a in the hammer 114a insures the desired shape of the preformed head 22a.

As shown in FIG. 17b, after the fourth step, the blank 62a is completely formed into the sleeve 12a.

What is claimed is:

1. A fastener comprising:
   a sleeve with a bore extending through said sleeve;
   an elongated stem adapted to extend through said sleeve;
   an annular collar engaged within said bore, wherein said collar is integral with said sleeve, said stem passing through said collar, said collar being slidable within said bore from a first position to a second position, said collar being sized so that when said collar is in said first position, said stem may be inserted within said sleeve and through said collar; and
   an upwardly facing shoulder on said stem, said shoulder being adapted to engage said collar as said stem is pulled through said sleeve, causing said collar to move from said first position to said second position, said collar being deformed in said second position so as to prevent said stem from sliding relative to said sleeve.

2. The fastener of claim 1, wherein said collar is adapted to be separated from said sleeve to allow said collar to slide relative to said sleeve.

3. The fastener of claim 1, wherein said collar is partially attached to said sleeve.

4. The fastener of claim 1, further comprising:

a locking groove surrounding the periphery of said stem, at least a portion of said groove being filled by said collar when said collar is deformed; and an enlarged diameter portion of said stem adjacent said groove, said stem shoulder being formed by the end of said enlarged portion.

5. A fastener comprising:

a sleeve with a bore extending through said sleeve;

an elongated stem adapted to extend through said sleeve;

an annular collar engaged within said bore, said stem passing through said collar, said collar being slidable within said bore from a first position to a second position, said collar being sized so that when said collar is in said first position, said stem may be inserted within said sleeve and through said collar;

an upwardly facing shoulder on said stem, said shoulder being adapted to engage said collar as said stem is pulled through said sleeve, causing said collar to move from said first position to said second position;

a preformed head at one end of sleeve, said first position being spaced from said preformed head, said second position being within said preformed head;

a lock pocket within said preformed head, said pocket having a larger diameter than said bore, wherein said lock pocket includes a reduced diameter lip, said lip having an inside diameter which is smaller than the inside diameter of the bore thereby forming a downwardly facing surface; said downwardly facing surface extends radially inwardly, into said bore, so that said collar abuts said downwardly facing surface when said collar is in said second position, said surface preventing movement of said collar from said second position so that said collar is deformed as said stem moves relative to said sleeve, said lock pocket being at least partially filled by said collar when said collar is deformed, so as to prevent said stem from sliding relative to said sleeve.

6. A fastener comprising:

a sleeve having a preformed head at one end, and a bore extending completely through said sleeve;

an elongated stem which extends through said sleeve;

an annular collar slidable within said bore from a first position to a second position, said stem passing through said collar;

an upwardly facing shoulder on said stem, said shoulder being adapted to engage one end of said collar;

a downwardly facing surface on said sleeve extending radially into said bore, said downwardly facing surface being adapted to engage the other end of said collar when said collar is in said second position, so that as said stem is pulled upwardly through said sleeve, said collar is deformed.

7. The fastener of claim 6, further comprising a lip portion within said preformed head, said lip portion having an inside diameter which is less than the diameter of said bore, said downwardly facing surface being formed by said lip portion.

8. The fastener of claim 6, further comprising an annular lock pocket within said preformed head, said lock pocket having a diameter which is greater that the diameter of said bore, the upper end of said lock pocket terminating at said downwardly facing surface, said collar at least partially filling said lock pocket upon deformation of said collar.

9. The fastener of claim 6, further comprising a lock groove on said stem, said lock groove positioned adjacent said stem shoulder, said lock groove having a smaller diameter than said shoulder, at least a portion of said lock groove being filled by said collar when said collar is deformed.

10. The fastener of claim 8, wherein said lock pocket further comprises a substantially upwardly facing shoulder, the lower end of said lock pocket terminating at said lock pocket shoulder, said collar being wedged between said lock pocket shoulder and said locking groove upon deformation of said collar.

11. The fastener of claim 6, wherein said first position of said collar is spaced from said preformed head, and said second position is within said preformed head, said collar being sized so that when said collar is in said first position said stem may be inserted within said sleeve and through said collar;

12. The fastener of claim 6, wherein said stem has an enlarged tail positioned at the end of said sleeve opposite from said preformed head, said tail causing said sleeve to expand as said stem is pulled through said sleeve, thus forming a blind head.

13. A self locking blind rivet comprising:

a sleeve having a preformed head at one end and a tubular body at another end, the central bore extending through said entire sleeve;

an elongated stem extending through said sleeve, said stem having a tail at one end, said tail having a large diameter relative to the remainder of said stem, said tail extending outwardly from said sleeve body, as said stem is pulled through said sleeve, said tail entering said sleeve body, causing said sleeve body to expand and form a blind head;

an annular collar within said bore, said collar being slidable from a first position within said sleeve body to a second position within said preformed head, said collar having an outside diameter sized to frictionally engage said bore, said collar being sized so that when said collar is in said first position, said stem may be inserted within said sleeve and through said collar;

a lock groove on said stem;

an enlarged diameter stem portion adjacent said lock groove, said enlarged diameter portion forming an upwardly facing shoulder, said shoulder adapted to engage said collar as said stem is pulled through said sleeve to cause said collar to slide from said first position to said second position; and a lock pocket within said preformed head, said lock pocket formed from a counterbore extending partially through said preformed head, said counterbore having a diameter which is greater than the diameter of said bore, with a tapered portion extending between said bore and said counterbore, said collar being deformable when in said second position to at least partially fill said lock pocket and said lock groove, thus preventing movement of said stem relative to said sleeve.

14. A fastener, comprising:

a sleeve having a first end and a second end, and a preformed head at said first end, and a bore extending through said sleeve;

an elongated stem extending through said sleeve;

an annular collar engaged within said bore, wherein said collar is integral with said sleeve, said collar being sized so that when said collar is positioned within said bore, said stem may be inserted within said sleeve and through said collar, said collar being adapted to be positioned within said bore prior to the insertion of said stem through said sleeve by moving said collar in a direction from said second end of said sleeve towards said first end; and an upwardly facing shoulder on said stem, said shoulder being adapted to engage said collar as said stem is pulled through said sleeve and to deform said collar so as to prevent said stem from sliding relative to said sleeve.

15. The fastener of claim 14, wherein said collar is partially attached to said sleeve.

16. The fastener of claim 14, wherein said collar is slideable within said bore from a first position spaced from said preformed head to a second position within said preformed head.

17. A method of installing a fastener, said fastener comprising a sleeve having a preformed head, a bore throughout, and a downwardly facing surface extending radially into said bore, a stem extending throughout said bore, a stem having an upwardly facing shoulder, a collar which is engaged within said bore and which is slidable within said sleeve from a first position to a second position, said collar being sized so that when said collar is positioned within said sleeve, said stem may be inserted through said sleeve and through said collar, said method comprising the steps of:

pulling said stem through said sleeve;
engaging said collar with said stem shoulder;
continuing to pull said stem through said sleeve so as to slide said collar along said bore from said first position to said second position;
preventing further motion of said collar once said collar reaches said second position by abutting said collar against said downwardly facing surface; and
applying a force to said collar with said stem shoulder so as to deform said collar by compressing said collar between said downwardly facing surface and said stem shoulder so that said collar prevents said stem from sliding out of said sleeve.

18. The method of claim 17 wherein said fastener further comprises a lock pocket within said preformed head, said lock pocket surrounding said bore and having a greater diameter than said bore, said lock pocket terminating at one end in said downwardly facing surface, the other end of said lock pocket terminating in a substantially upwardly facing sleeve shoulder, and a lock groove surrounding said stem adjacent said stem shoulder, said method further comprising the steps of:

filling at least a portion of said lock groove and said lock pocket with said collar upon deformation of said collar; and
wedging said collar between said sleeve shoulder and said lock groove so as to prevent downward motion of said stem relative to said sleeve.

19. The method of claim 17, wherein said stem further comprises an enlarged tail which protrudes outwardly from said sleeve at an end of said sleeve opposite said preformed head, said method further comprising the step of introducing said tail into said sleeve so as to expand said sleeve as said stem is pulled through said sleeve, said tail and said expanded sleeve portion forming a blind head.

20. The method of claim 17, wherein said collar is formed from sleeve material and is partially attached to said sleeve, said method further comprising the step of separating said collar from said sleeve as collar slides from said first position to said second position.

21. A fastener comprising:
a sleeve with a bore extending through said sleeve;
an elongated stem extending through said sleeve;
an annular collar within said bore, said collar being formed from a portion of said sleeve material which is separated from said sleeve wherein said collar is partially attached to said sleeve, said stem passing through said collar, said collar being slidable within said bore from a first position to a second position, said collar being in said first position prior to the insertion of said stem within said stem; and
an upwardly facing shoulder on said stem, said shoulder being adapted to engage said collar as said stem is pulled through said sleeve, causing said collar to move from said first position to said second position, said collar being deformed when in said second position so as to prevent said stem from sliding relative to said sleeve.

22. A fastener comprising:
a sleeve having a preformed head at one end, and a bore extending through said sleeve;
an elongated stem extending through said sleeve;
an annular collar within said bore, said collar being formed from a portion of sleeve material which is separated from said sleeve, wherein said collar remains partially attached to said sleeve, said collar being positioned within said bore prior to the insertion of said stem within said sleeve, by moving said collar upwardly, toward said preformed head; and
an upwardly facing shoulder on said stem, said shoulder being adapted to engage said collar as said stem is pulled through said sleeve and to deform said collar so as to prevent said stem from sliding relative to said sleeve.

23. A method of installing a fastener, said fastener comprising a sleeve having a preformed head and a bore throughout, a downwardly facing surface extending from said sleeve into said bore, stem extending through said bore, said stem having an upwardly facing shoulder, a collar which is slidable within said sleeve from a first position to a second position, said collar being formed from sleeve material and being partially attached to said sleeve, said collar being positioned within said sleeve before said stem is inserted therein, said method comprising the steps of:

pulling said stem through said sleeve;
engaging said collar with said stem shoulder;
sliding said collar along said bore from said first position to said second position;
separating said collar from said sleeve as said collar slides from said first position to said second position;
abutting said collar against said downwardly facing surface so as to prevent further motion of said collar once said collar reaches said second position; and
applying a force to said collar with said stem shoulder by compressing said collar between said downwardly facing surface and said stem shoulder so as to deform said collar, so that said collar prevents said stem from sliding out of said sleeve.

24. The fastener of claim 14, wherein said collar is adapted to be separated from said sleeve to allow said collar to slide relative to said sleeve.

* * * * *